United States Patent [19]

Busch et al.

[11] 3,915,664

[45] Oct. 28, 1975

[54] MOULDED ARTICLE

[75] Inventors: Wolfram Busch; Karl-Heinz Godava; Manfred Richter; Hanspeter Schulz, all of Wiesbaden; Hermann Wallhauber, Wehen, all of Germany

[73] Assignee: Hoechst Aktiengesellschaft, Wiesbaden, Germany

[22] Filed: Jan. 19, 1972

[21] Appl. No.: 219,177

[30] Foreign Application Priority Data

Jan. 20, 1971 Germany............................ 2102550

[52] U.S. Cl. ................. 29/195; 428/901; 428/460; 174/68.5
[51] Int. Cl...... C23b 5/64; H05k 1/00; B32b 15/08
[58] Field of Search ...... 174/68.5; 161/215, DIG. 7, 161/188; 117/71 R, 160 R, 138.8 G, 227

[56] References Cited
UNITED STATES PATENTS

| | | | |
|---|---|---|---|
| 2,432,544 | 12/1947 | Rhodes | 161/215 X |
| 2,554,262 | 5/1951 | Nagel | 161/215 |
| 2,690,879 | 10/1954 | Snyder | 161/215 X |
| 2,694,028 | 11/1954 | Rapp | 161/215 X |
| 2,917,439 | 12/1959 | Liu | 117/71 R |
| 3,131,086 | 4/1964 | Nyquist et al. | 117/138.8 G |
| 3,161,919 | 12/1964 | Renaud | 161/215 X |
| 3,450,595 | 6/1969 | Salter et al. | 161/215 |
| 3,483,074 | 12/1969 | Squitieri et al. | 161/215 X |
| 3,488,166 | 1/1970 | Kovac et al. | 117/138.8 G |
| 3,733,213 | 5/1973 | Jacob | 117/160 R |
| 3,736,170 | 5/1973 | Endell et al. | 117/160 R |
| 3,741,800 | 6/1973 | Baier et al. | 117/160 R |
| 3,764,280 | 10/1973 | Lupinski | 117/71 R |
| 3,764,488 | 10/1973 | Bernhardt | 117/227 X |

*Primary Examiner*—Harold Ansher
*Attorney, Agent, or Firm*—Hammond & Littell

[57] ABSTRACT

A moulded article being at least partially provided with a metal coating of good adhesive power comprising a hardened product of a moulding composition comprising (a) a mixed condensate of a phenoplast-forming phenol, an aminoplast forming compound and formaldehyde, or (b) a mixture of a phenol formaldehyde condensate with a condensate of formaldehyde with an aminoplast forming compound or (c) a mixture of (a) and (b) and in which moulding composition the molar ratio of phenol to aminoplast forming compound is from 1:0,05 to 1:20, the said metal coating being formed in at least two steps, which moulded article is suitable as a printed circuit.

11 Claims, No Drawings

MOULDED ARTICLE

This invention is concerned with moulded plastics articles provided with a metallic coating.

In the production of a metallic coating on plastics by galvanic means it is usually necessary to provide the electrically non-conductive plastics surface with a primary coating of a metallic character to ensure that the electrical conductivity of the surface is sufficient to enable the article to be used in a galvanic process.

A convenient method of producing the primary coating is to firstly roughen the surface of the plastics by chemical or mechanical means and then coat the plastics surface with a catalytic quantity of a precious metal, preferably palladium or silver, by means of one or more so-called activation baths. The precious metal nuclei so obtained can then catalytically reduce metastable metal salt baths which may contain e.g. copper or nickel salts, stabilising complex components such as organic amines or hydroxy carboxylic acids or reducing agents such as formalin, an alkali metal borate or a hypophosphite. After such plastics members have been immersed in a metastable bath for a short time a metal film, e.g. of copper or nickel, forms. The thickness of the film so formed is, of course, partly dependent on the residence time of the plastics member in the bath. This film has the necessary electrical conductivity for subsequent galvanic coating of the surface with e.g. copper, nickel and/or chromium.

The production of such primary coatings by chemical reduction and the subsequent galvanic strengthening of this coating may be effected on a variety of thermoplastic and thermosetting materials.

In practice however very few plastics notably polypropylene and acrylonitrile-butadiene-styrene resins have proved suitable for galvanic surface treatment. With most other plastics the degree of adhesion of the metal coating to the plastics surface has proved to be of limited strength or to be non-uniform over the surface of the moulded article. The metal coating has proved to be easily detachable upon mechanical stressing or stressing caused by temperature changes. It has been found to be particularly difficult to achieve good adhesion to conventional thermosetting plastics based on phenol, melamine or urea formaldehyde resins as well as hardenable moulding masses based on unsaturated polyesters.

Attempts have been made to apply several metal coatings to the plastics member, e.g. based on phenoplast or aminoplast, by varying the composition of the galvanic baths whereby adhesion is improved by tensile stressing of the external metal coating. In these circumstances the metal covering is substantially held together by the stressed external metal coating when such metal coatings are bonded to special electrolytes. There is a need for moulded articles possessing good adhesion as a base material to a metal coating. Such adhesion should be substantially independent of the tensile strength of the metal film so that the moulded article is better suited to thermal stress.

The present invention provides a moulded article being at least partially provided with a metal coating of good adhesive power comprising a hardened product of a mouding composition comprising (a) a mixed condensate of a phenoplast-forming phenol, an aminoplast forming compound and formaldehyde, or (b) of a mixture of a phenol formaldehyde condensate with a condensate of formaldehyde with an aminoplast forming compound or (c) a mixture of (a) and (b) and in which moulding composition the molar ratio of phenol to aminoplast forming compound is from 1:0.05 to 1:20, the said metal coating being formed in at least two steps. The phenol is preferably substituted in the o-position by formaldehyde.

The two steps of the coating comprise the deposition of a primary coating on the moulded article by reduction of a copper, nickel, silver, gold, palladium or platinum salt and in the second step a secondary coating of a metal such as copper, nickel, silver, gold, palladium, platinum, chromium, zinc or tin is electrically deposited upon said primary coating.

The primary coating may be very thin e.g. less than $1\mu m$ and is preferably of copper, nickel, or silver. The secondary coating may also be thin, e.g. from 10 to $200\mu m$; and may be as thin as $5\mu m$ or much thicker e.g. $500\mu m$. The secondary coating is preferably of nickel, copper and/or chromium and the primary and secondary coatings can be of the same metal.

It is surprising that the metals adhere so well to the moulded articles containing the above-indicated hardened resin components, because this is not the case with metal coatings on moulded articles whose resin components are hardened phenol resins or hardened aminoplasts. Good adhesion is obtained between the hardened resin component in the moulded articles according to the invention and the metal coating by means of chemical interaction. Such excellent affinity of hardened products to metals deposited by galvanic methods has been hitherto unknown.

The good adhesion is achieved over a wide range of molar ratios of phenol to aminoplast-forming compound in the mixed condensate or in the resin mixture, viz. small amounts of phenol in a melamine resin and conversely small amounts of melamine in a phenol resin suffice to bring about considerably improved adhesion of the galvanic coating compared with moulding masses based on pure melamine or phenol resins. The molar ratio of the phenol to the aminoplast-forming compound is preferably from 1:0.1 to 1:10.

The formaldehyde portion of the resins has no decisive influence on the metal adhesion but it does effect the reactivity, water compatibility and viscosity of the resins to be processed as well as the extent of crosslinking and the desired physical and chemical properties of the hardened moulded articles. Generally the ratio of the sum of the phenol and the aminoplast-forming compound to formaldehyde is 1:0.8 to 1:5, preferably 1:1 to 1:4. Part of the formaldehyde can be liberated from added hexamethylene tetramine, paraformaldehyde or similar formaldehyde-yielding substances during the hardening reaction.

The phenol component may be phenol; a substituted phenol such as a p-alkylphenol with 1 to 12 C-atoms, e.g. p-cresol, p-tert. butylphenol, p-isooctylphenol, p-nonylphenol, p-dodecylphenol or mixtures thereof e.g. with other isomers; a bisphenol or resorcinol. The aminoplast-forming compounds can be urea, thiourea, benzoguanamine or a homologue thereof such as acetoguanamine, ammeline, ammelide and, preferably, melamine. If the moulded articles are produced from moulding masses containing resin mixtures of mixed condensates the phenol-resin component can be both a novolak and a resol or a mixture of both.

In the ideal case of a mixed condensation of such resins alternating structures are obtained e.g. of phenol and melamine molecules connected by methylene bridges. Such molecules are obtained when the reaction is appropriately performed either directly during the production of the resin by condensation of phenol and melamine with formaldehyde e.g. an aqueous solution or as paraformaldehyde or during processing of the moulding mass if corresponding separately produced phenol-formaldehyde and amine-formaldehyde resins are mixed during the hardening processes.

Aminoplast-phenol-formaldehyde resins and their production processes are known, as also are hardenable moulding masses based on said resins or based on resin mixtures of phenol-formaldehyde resins and aminoplast-formaldehyde resins, but what had not been appreciated is that moulded articles made from such resins have excellent affinity to metals, and that the metal coatings produced chemically and galvanically adhere so well thereto. The affinity is greater than that of masses based on phenol resins or aminoplasts alone. The metal adhesion is particularly good if the methylene bridging groups are preponderantly present in the o-position to the phenol OH-group.

The metal adhesiveness of the hardening products contained in the moulded articles according to the invention is shown during the galvanisation. Whereas moulded aricles made from conventional hardenable moulding masses based on phenol-formaldehyde, melamine-formaldehyde, urea-formaldehyde or unsaturated polyester resins only have limited adhesion relative to the primary metallic conductive coating and the galvanically applied metal coating, excellent adhesion is obtained with the moulded articles according to the invention. In the peeling test (using test plates with a 40μm thick galvanic copper layer) adhesions of 3 to 4kp/25 mm are obtained, whereas in the case of the non-adhesive thermosetting plastics this figure is generally below 1 kp/25 mm. Additionally, with non-adhesive thermosetting plastics the adhesion level varies widely over the test zone of a few centimeters.

The moulded articles according to the invention with a decorative or functional metal coating have a number of practical advantages, compared with the hitherto known thermoplastic galvanised plastic articles. In particular the articles possess good stability of shape, thermal stability, thermal and chemical resistance and glow resistance, a low thermal expansion coefficient, low price and varied uses, e.g. for electro-technical, motor car, household and sanitary articles. As the mechanical and thermal properties of thermosetting plastics moulded articles can be improved by galvanic surface treatment, such galvanised thermosetting plastics articles have considerable practical significance.

The galvanised thermosetting plastics moulded articles according to the invention can be used e.g. for window and door handles in the motor car industry; for sanitary installations such as taps, shower fittings and overflow devices; headlamp reflectors and housings; rear lights and flashing light housings; housings and operating devices for household goods such as toasters, coffee machines, grills, boilers, cookers, washing machines, dish washing machines, casings or irons and ash trays; coffin and furniture fittings; urns; galvanised structural members in electrical engineering; collector rings and slip rings as well as printed circuits directly galvanised by subtractive or additive processes.

An important practical advantage of the moulded articles according to the invention is that they can be galvanised by conventional plastic galvanisation methods such as, for example, are used for thermoplastic acrylonitric-butadiene-styrene and propylene without additional or modified baths being necessary.

The moulded articles according to the invention, can contain any of the usual fillers, e.g. wood, cellulose, asbestos or mica flour, chalk, marble or limestone, fine-particle metal or metalloid oxides such as titanium dioxide, silicone dioxide, iron oxide, magnesium oxide, aluminium oxide or mixed oxides as occur in silicates, textile fibres or scraps, cellulose, wood or asbestos fibres, glass fibres or balls, rice-husk ash, etc. acccording to the requirements to be fulfilled regarding mechanical, electrical, thermal or chemical stressing. It is advantageous to have a proportion of acid-soluble fillers because prior to the application of the primary coating a pretreatment of the plastic moulded article may be necessary to remove grease and cause roughening thereof, which can be performed by any of the usual methods of galvanic technology e.g. with warm chromosulfuric acid. Acid treatment has the additional advantage that no particles are detached from the areas of the moulded article close to the surface, thereby leading to a considerable enlargement of the metal-adhesive surface.

The moulding masses from which the moulded articles according to the invention are produced contain further conventional ingredients e.g. lubricants and mould removal agents, such as stearic acid, its esters, its metal salts e.g. barium stearate or zinc stearate, dyes, pigments and hardening accelerators and the like.

In order that the invention may be well understood the following Example is given by way of illustration only.

EXAMPLE 55.5 parts by weight of a resin mixture of an acid-condensed novolak with a molar ratio of phenol to formaldehyde of 1:0.78 (23.5 parts by weight) and a conventional melamine resin (32 parts by weight) were mixed with 33.2 parts by weight of paper flour, 10.8 parts by weight of limestone flour and 0.5 parts by weight of barium stearate as the lubricant and processed in the usual manner to a fine-particle hardenable moulding mass by employing a rolling process with subsequent grinding process. From this material at 160°C and 80 $t$ applied pressure with a standing time of 5 minutes a series of 15 × 15 × 0.4 cm$^3$ test plates were produced.

These plates were initially conditioned for 30 minutes in chromosulfuric acid at 70°C, then thoroughly washed with water and activated in a conventional palladium salt solution (e.g. "Galniplast 225" of Chemopur H Brand GmbH Herme) and a conventional SnCl$_2$ solution ("Catalyt II" of Blasberg GmbH & Co. Solingen-Mehrscheid) in each case at room temperature. Activating nuclei were deposited on the surface from the palladium salt solution, and these nuclei were reduced by the tin chloride with the formation of activating crystallites. A nickel coating was then deposited onto the activated moulded article from a conventional nickel solution (e.g. metallic nickle — Bn 10.890 0 of Blasberg GmbH & Co. KG, Solingen-Mehrscheid). The moulded article was washed with water and treated with 2% oxalic acid solution to remove any adhering traces of oxidising agent.

Copper pretreatment was then performed for 5 minutes in an acid copper salt bath with a low current density (1 A/dm$^2$). Subsequently an approximately 40 to 60 μm copper coating was galvanically applied from a conventional copper salt bath with the current density of 4 A/dm$^2$.

After storage for 24 hours 25 mm wide strips were cut from the test bodies at room temperature and their adhesion was assessed under normal conditions by means of the peeling test. Values of 3.0 kp/25 mm were obtained for a 55μm copper coating and 3.5 kp/25 mm for a 70μm copper coating.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A moulded article being at least partially provided with a metal coating of good adhesive power comprising a hardened product of a moulding composition comprising (a) a mixed condensate of a phenoplast-forming phenol, an aminoplast forming compound and formaldehyde, or (b) a mixture of a phenol formaldehyde condensate with a condensate of formaldehyde with an aminoplast forming compound or (c) a mixture of (a) and (b) and in which moulding composition the molar ratio of phenol to aminoplast forming compound is from 1:0.05 to 1:20, the said metal coating directly contacting the hardened product and consisting of at least two metal layers.

2. A moulded article according to claim 1 wherein the molar ratio of I) phenol and aminoplast forming compound to II) formaldehyde is from 1:0.8 to 1:5.

3. A moulded article according to claim 1 wherein the phenoplast forming compound is phenol, p-methylphenol, p-tert.-butylphenol, p-iso-octylphenol, p-nonylphenol, p-dodecylphenol or mixtures thereof, a bisphenol or resorcinol.

4. A moulded article according to claim 1 wherein the phenolic resin is a novolak and/or a resol type resin.

5. A moulded article according to claim 1 wherein the aminoplast forming compound is urea, thiourea, benzoguanamine, acetoguanamine, ammeline, ammelide or melamine.

6. A moulded article according to claim 1 wherein the aminoplast group are linked in ortho-position to the phenolic hydroxyl group by methylene bridging or linking groups.

7. A printed circuit consisting of a moulded article according to claim 1.

8. A moulded article according to claim 1 wherein at least a part of the filler used in the moulding composition is soluble in chromosulfuric acid.

9. A moulded article according to claim 1 wherein the metal layer which directly contacts the hardened product consists of chemically deposited copper, nickel, silver, gold, palladium or platinum.

10. A moulded article according to claim 9 in which the metal layer supports a second metal layer which has a thickness of from 5 to 500 μm and is deposited galvanically and consists of copper, nickel, silver, gold, palladium, platinum, chromium, zinc or tin.

11. A printed circuit consisting of a moulded article according to claim 10.

* * * * *